United States Patent
Hu et al.

(10) Patent No.: US 8,107,774 B2
(45) Date of Patent: Jan. 31, 2012

(54) IMAGE DATA PROCESSING METHOD AND IMAGE DISPLAY APPARATUS

(75) Inventors: Po-Chin Hu, Taoyuan County (TW); Ming-Yu Lin, Tainan (TW); Wei-Chen Tsai, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 1152 days.

(21) Appl. No.: 11/867,696

(22) Filed: Oct. 5, 2007

(65) Prior Publication Data
US 2009/0010569 A1    Jan. 8, 2009

(30) Foreign Application Priority Data

Jul. 5, 2007   (TW) .............................. 96124483 A

(51) Int. Cl.
| | |
|---|---|
| G06K 9/34 | (2006.01) |
| G06K 9/46 | (2006.01) |
| G06K 9/66 | (2006.01) |
| G06K 9/32 | (2006.01) |
| G06K 1/00 | (2006.01) |
| G06K 15/02 | (2006.01) |
| H04N 7/18 | (2006.01) |
| H04N 9/47 | (2006.01) |
| H04N 9/04 | (2006.01) |
| H04N 5/225 | (2006.01) |
| H04N 5/228 | (2006.01) |
| H04N 5/262 | (2006.01) |
| H04N 1/60 | (2006.01) |
| H04N 1/46 | (2006.01) |
| G06F 15/00 | (2006.01) |

(52) U.S. Cl. ........ 382/300; 382/173; 382/190; 382/293; 348/61; 348/63; 348/207.99; 348/222.1; 348/240.2; 358/1.2; 358/1.9; 358/525; 358/528

(58) Field of Classification Search .................. 382/173, 382/181, 190, 195, 276, 293–301; 348/61–63, 348/207.99, 222.1, 240.99–240.3; 358/1.1–1.2, 358/1.9, 525, 528, 538
See application file for complete search history.

(56) References Cited

U.S. PATENT DOCUMENTS 5,671,298 A    9/1997   Markandey et al.
(Continued)

OTHER PUBLICATIONS

Feng Liu and Michael Gleicher. 2005. Automatic image retargeting with fisheye-view warping. In Proceedings of the 18th annual ACM symposium on User interface software and technology (UIST '05). ACM, New York, NY, USA, 153-162. DOI=10.1145/1095034. 1095061 http://doi.acm.org/10.1145/1095034.1095061.*

(Continued)

*Primary Examiner* — Anand Bhatnagar
*Assistant Examiner* — Nathan Bloom
(74) *Attorney, Agent, or Firm* — Jianq Chyun IP Office

(57) ABSTRACT

An image data processing method is provided. In this method, a plurality of original pixel values of an image is input. An interpolation position of a target pixel in the image is determined. Whether the interpolation position is in a central region of an object or in a marginal region of an object is determined. A pixel value interpolation with respect to the interpolation position is performed. When the interpolation position is in the central region of an object, the pixel value interpolation is performed in a first calculation mode, and when the interpolation position is in the marginal region of an object, the pixel value interpolation is performed in a second calculation mode, wherein the first calculation mode may be a low pass filtering interpolation mode, and the second calculation mode may be a linear interpolation mode.

18 Claims, 5 Drawing Sheets

U.S. PATENT DOCUMENTS

| | | | |
|---|---|---|---|
| 6,175,659 | B1 | 1/2001 | Huang |
| 6,987,893 | B2 | 1/2006 | Kim |
| 2002/0048413 | A1* | 4/2002 | Kusunoki ................... 382/282 |
| 2002/0064314 | A1* | 5/2002 | Comaniciu et al. .......... 382/239 |
| 2002/0076121 | A1* | 6/2002 | Shimizu et al. ............. 382/300 |
| 2003/0077002 | A1* | 4/2003 | Silverstein et al. .......... 382/282 |
| 2003/0081225 | A1* | 5/2003 | Nakami et al. .............. 358/1.2 |
| 2003/0128882 | A1* | 7/2003 | Kim et al. ................... 382/239 |
| 2004/0028292 | A1* | 2/2004 | Alm et al. ................... 382/298 |
| 2006/0177151 | A1* | 8/2006 | Miyazawa et al. .......... 382/298 |
| 2007/0180374 | A1* | 8/2007 | Gormish ..................... 715/539 |
| 2008/0238947 | A1* | 10/2008 | Keahey et al. ............... 345/666 |

OTHER PUBLICATIONS

Keahey, T.A.; Robertson, E.L.; , "Techniques for non-linear magnification transformations," Information Visualization '96, Proceedings IEEE Symposium on , vol., No., pp. 38-45, Oct. 28-29, 1996 doi: 10.1109/INFVIS.1996.559214 URL: http://ieeexplore.ieee.org/stamp/stamp.jsp?tp=&arnumber=559214&isnumber=12180.*

Keahey, T.A.; Robertson, E.L.; , "Nonlinear magnification fields," Information Visualization, 1997. Proceedings., IEEE Symposium on , vol., No., pp. 51-58, Oct. 21-21, 1997, doi: 10.1109/INFVIS.1997.636786 URL: http://ieeexplore.ieee.org/stamp/stamp.jsp?tp=&arnumber=636786&isnumber=13801.*

Hong Chen; Ford, G.E.; , "An FIR image interpolation filter design method based on properties of human vision," Image Processing, 1994. Proceedings. ICIP-94., IEEE International Conference , vol. 3, No., pp. 581-585 vol. 3, Nov. 13-16, 1994 doi: 10.1109/ICIP.1994.413739 URL: http://ieeexplore.ieee.org/stamp/stamp.jsp?tp=&arnumber=413739&isnumber=9214.*

Dube, S.; Li Hong; , "An adaptive algorithm for image resolution enhancement," Signals, Systems and Computers, 2000. Conference Record of the Thirty-Fourth Asilomar Conference on , vol. 2, No., pp. 1731-1734 vol. 2, 2000 ndoi: 10.1109/ACSSC.2000.911284 URL: http://ieeexplore.ieee.org/stamp/stamp.jsp?tp=&arnumber=911284&isnumber=19639.*

* cited by examiner

IMAGE DATA PROCESSING METHOD AND IMAGE DISPLAY APPARATUS

CROSS-REFERENCE TO RELATED APPLICATION

This application claims the priority benefit of Taiwan application serial no. 96124483, filed Jul. 5, 2007. All disclosure of the Taiwan application is incorporated herein by reference.

BACKGROUND OF THE INVENTION

1. Field of the Invention

The present invention generally relates to an image processing technique, in particular, to an interpolation mechanism for changing image resolution.

2. Description of Related Art

Generally speaking, the resolution of a display and the resolution of an image to be displayed by the display may not be the same. Usually, the resolution of an image is lower than that of a display. Accordingly, the resolution of an image is usually converted to the resolution of a display before the image is displayed. In addition, the scale of an image may be appropriately adjusted before it is displayed in a display, which may also make the resolution of the image different from that of the display so that the resolution of the image has to be converted before the image is displayed. Foregoing situation is very common to flat panel digital TVs. Conventionally, an interpolation mechanism is adopted for resolving foregoing problem of resolution inconsistence, wherein the pixel values at corresponding pixel positions of the display (also referred as gray scale values) are calculated according to the corresponding pixel values of the image.

Interpolation mechanisms are generally categorized into linear interpolation mechanisms and non-linear interpolation mechanisms. According to non-linear interpolation mechanisms, a rectangular image is projected into a new geometrical figure through a warp-based algorithm. In this case, the interpolation effects in the marginal region and the central region of the image may be different. For example, the warp-based interpolation has better performance to the central region of the image than to the marginal region thereof. FIG. 1 illustrates the edge obscurity caused by a conventional interpolation mechanism. Referring to FIG. 1, obscurity 12 is produced at the edge of the image 10 of a displayed text (here it is "2") after the image 10 is adjusted by using the conventional interpolation mechanism. Usually, people focus more on the central region of an image, thus, the warp-based interpolation is broadly adopted. However, another non-linear interpolation mechanism is provided in order to resolve foregoing problem of edge obscurity, wherein a curve fitting calculation is performed by using a Hermite curve. However, the problem of edge obscurity cannot be totally resolved.

If a linear interpolation mechanism is adopted for resolving the problem of resolution inconsistence, the interpolation effect in the central region of an object is not satisfactory and image distortion may be caused even though the linear interpolation mechanism has good performance in sharpening the edges of an object. There are still many other conventional interpolation mechanisms can be used but they all have problems regarding the interpolation effects in the central region and the marginal region of an object. Thereby, how to improve the interpolation effect of an image so that the image quality can be retained when the scale of the image is adjusted has to be resolved.

SUMMARY OF THE INVENTION

Accordingly, at least one objective of the present invention is to disclose an image data processing method, wherein an interpolation mechanism is respectively provided to a central region and a marginal region of an object in an image according to the characteristics of the two regions so as to improve the display quality of the image in the central region and the marginal region of the object.

The present invention is directed to an image display apparatus, wherein an interpolation calculation is respectively performed to a central region and a marginal region of an object in an image so as to improve the display quality of the image in the central region and the marginal region of the object.

The present invention provides an image data processing method. In this method, first, a plurality of original pixel values of an image is input. Then, an interpolation position of a target pixel in the image is determined. Next, whether the interpolation position is in a central region or a marginal region of an object is determined. After that, a pixel value interpolation with respect to the interpolation position is performed. When the interpolation position is in the central region of an object, the pixel value interpolation is performed in a first calculation mode, and when the interpolation position is in the marginal region of an object, the pixel value interpolation is performed in a second calculation mode.

According to an embodiment of the present invention, in foregoing image data processing method, the step of determining whether the interpolation position is in the central region or the marginal region of an object may include following steps. First, a first number of the original pixel values and a second number of the original pixel values are respectively obtained in a first and a second direction with the interpolation position as a center and these original pixel values are used as a plurality of analysis samples. Then, a first uniformity of the first number of original pixel values is calculated, and a second uniformity of the second number of original pixel values is calculated. After that, an absolute difference between the first uniformity and the second uniformity is calculated. Next, whether the pixel value interpolation with respect to the interpolation position is performed in the first calculation mode or the second calculation mode is determined according to a first logic condition and a determined calculation mode is obtained. According to the first logic condition, the determined calculation mode is the first calculation mode if the absolute difference is smaller than a first threshold and at least one of the first and the second uniformity is greater than a second threshold, otherwise, the determined calculation mode is the second calculation mode.

According to an embodiment of the present invention, the image data processing method further includes a correction step, wherein an odd number W of the determined calculation mode is obtained with the interpolation position as the center of the object and is used as an inspection window, and the determined calculation mode is corrected according to a second logic condition. According to the second logic condition, first, a number S of pixels belonging to the first calculation mode are obtained in the inspection window, and whether $S>(W-1)/2$ is determined, wherein if $S>(W-1)/2$, the determined calculation mode is set to the first calculation mode; otherwise the determined calculation mode is set to the second calculation mode.

According to an embodiment of the present invention, in foregoing image data processing method, the first calculation mode may be a low pass filtering interpolation mechanism, and the second calculation mode may be a linear interpolation mechanism.

The present invention further provides an image display apparatus including an image scale device. The image scale device receives a plurality of original pixel values of an image and outputs the scaled pixel values. The image scale device includes a first circuit unit, a second circuit unit, and a third circuit unit. The first circuit unit determines an interpolation position of a target pixel in the image. The second circuit unit determines whether the interpolation position of the target pixel is in the central region or the marginal region of an object and generates a determination result with respect to the target pixel. The third circuit unit selects a pixel value interpolation mode according to the determination result so as to perform a pixel value interpolation.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
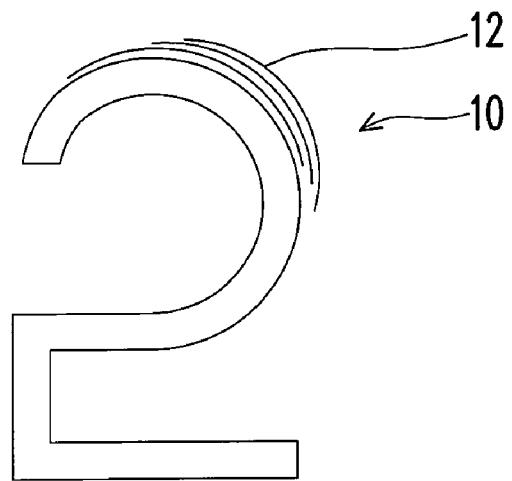
FIG. 1 illustrates the edge obscurity caused by a conventional low pass filtering interpolation mechanism.

Reference will now be made in detail to the present preferred embodiments of the invention, examples of which are illustrated in the accompanying drawings. Wherever possible, the same reference numbers are used in the drawings and the description to refer to the same or like parts.

The present invention provides an interpolation method, wherein a low pass filtering interpolation mechanism is adopted for interpolating pixels in the central region of an object in an image and a linear interpolation mechanism is adopted for interpolating pixels in the marginal region of an object in the image, so that both the characteristics of the original image in the central region of the object and the original sharpness at the edges of the object can be retained.

Figure 2:
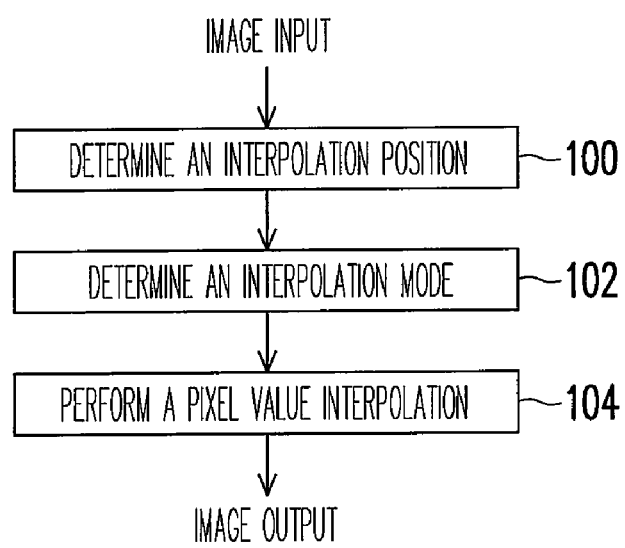
FIG. 2 illustrates a pixel value interpolation mechanism according to an embodiment of the present invention.

FIG. 2 illustrates a pixel value interpolation mechanism according to an embodiment of the present invention. Referring to FIG. 2, the image data processing method in the present invention includes following steps. First, a plurality of original pixel values of an image is input. For example, when a target pixel is obtained by adjusting the size or scale of the image with respect to the resolution of the display, an interpolation position of the target pixel in the image is determined in step 100. Next, in step 102, whether the interpolation position is in the central region or the marginal region of an object in the original image is determined. After that, a corresponding pixel value interpolation is performed with respect to the interpolation position, wherein the pixel value interpolation is performed in a first calculation mode when the interpolation position is in the central region of an object, and the pixel value interpolation is performed in a second calculation mode when the interpolation position is in the marginal region of an object. The first calculation mode may be a low pass filtering interpolation mode, and the second calculation mode may be a linear interpolation mode. A new image is formed by the interpolated target pixel and is output to a subsequent display circuit.

Foregoing interpolation mechanism can be implemented with a circuit, and the circuit can be disposed in an image display apparatus as a part of the image display apparatus. In other words, besides its main circuit, the image display apparatus further includes an image scale device for receiving a plurality of original pixel values of an image and outputting the scaled pixel values. The image scale device may include a first circuit unit, a second circuit unit, and a third circuit unit. The first circuit unit determines an interpolation position of a target pixel in the image in step 100. The second circuit unit determines whether the interpolation position is in the central region or the marginal region of an object in the image in step 102. The third circuit unit performs a corresponding pixel value interpolation with respect to the interpolation position in step 104, wherein the pixel value interpolation is performed in a first calculation mode when the interpolation position is in the central region of the object, and the pixel value interpolation is performed in a second calculation mode when the interpolation position is in the marginal region of the object.

It should be noted here that the interpolation mechanism is not limited to being implemented with only hardware or a circuit in an image display apparatus; in an actual application, the interpolation mechanism may also be implemented with hardware (processor) executing software (firmware), which also belongs to the scope of the present invention.

In the present invention, two different interpolation mechanisms are adopted for interpolating pixels with respect to the characteristics of different areas, thus, the original image information of both the central region and the marginal region of an object in the image can be retained.

Figure 3:
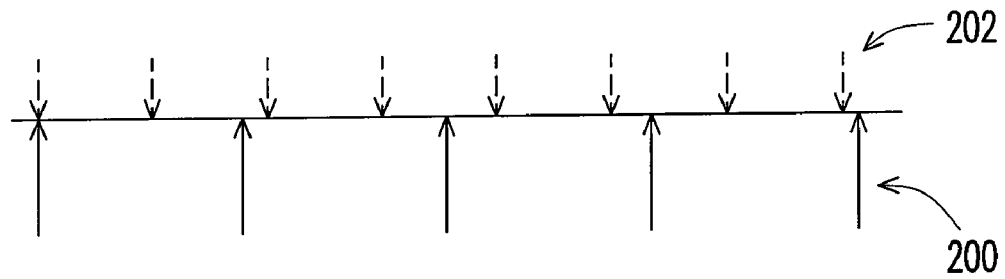
FIG. 3 illustrates a mechanism for changing the resolution of an image adopted by the present invention.

The interpolation mechanism adopted by the present invention will be further described below. FIG. 3 illustrates a mechanism for changing the resolution of an image adopted by the present invention. Referring to FIG. 3, there are many original pixels 200 on a display line or a line frame of an original image. In the present embodiment, the resolution of the original image is lower than the resolution of the interpolated pixels 202 of the display apparatus. Thus, the gray scale data of the corresponding interpolated pixels 202 at the corresponding interpolation positions (dotted line points) is obtained by performing an interpolation on the gray scale data of adjacent two pixels.

Generally speaking, if a scaling rate R is used for representing an interpolation position, the distance between two adjacent interpolation points is 1/R, and the interpolation position is n/R. As shown in FIG. 3, the interpolated pixels 202 are re-distributed evenly at positions denoted by the dotted arrows. If R=16/9, the interpolation positions are 0, 9/16, 18/16, . . . etc, which are also corresponding to the positions denoted by the dotted arrows FIG. 5.

Below, the mechanism for determining whether a pixel is in the central region or the marginal region of an object will be described. Whether an interpolation point is in the central region or the marginal region of an object can be determined through analysis of pixel data; however, it is not limited to any particular method. However, different mechanisms have different complexities and result in different calculation loads and different accuracies. An embodiment of the present invention will be described below.

Figure 4:
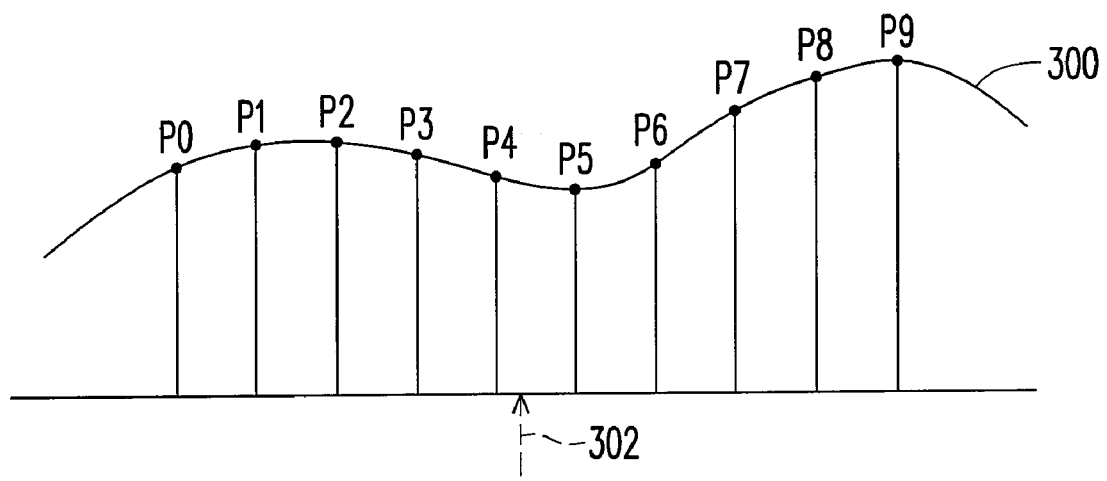
FIG. 4 illustrates a mechanism for determining whether an interpolation position is in the marginal region of an object according to an embodiment of the present invention.

FIG. 4 illustrates a mechanism for determining whether an interpolation position is in the marginal region of an object according to an embodiment of the present invention. Referring to FIG. 4, a number of original pixel values 300 adjacent to the interpolation point 302 are obtained. In the present embodiment, ten pixel values P0~P9 are obtained, and the ten pixel values are divided into left original pixel values and right original pixel values with the interpolation point 302 as a center. Here the "left" and "right" are only used for the convenience in describing the pixels at both sides of the interpolation point 302.

Figure 5:
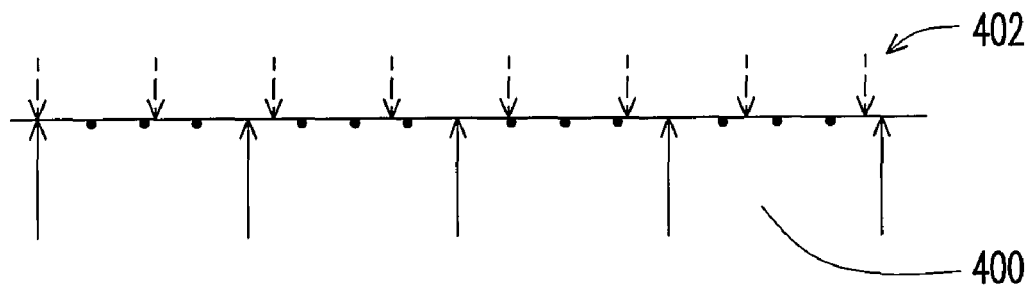
FIG. 5 illustrates the relationship between an original resolution and a target resolution according to an embodiment of the present invention.

FIG. 5 illustrates the relationship between an original resolution and a target resolution according to an embodiment of the present invention. As illustrated in FIG. 3, the resolution of the original pixels 400 is converted to the higher resolution of a target image, wherein the scaling rate R is R=16/9, which means the range containing five original pixels 400 is to be divided into 16 equal parts. The interpolated pixels 402 are distributed at the corresponding positions of the 16 equal parts. If the first interpolation point is located on an original pixel, the second interpolation point is then located at the position of 9/16, and so on. As shown in FIG. 4, the situation that ten original pixel values with respect to an interpolation point are obtained will be analyzed as an example. Usually, an appropriate number of original pixel values are obtained at each side of the interpolation point. The numbers of original pixel values at two sides of the interpolation point do not have to be equal, and the total number of original pixel values obtained does not have to be ten. Actually, the numbers of original pixel values obtained at both sides can be determined according to the mechanism adopted and the calculation speed.

Figure 6:
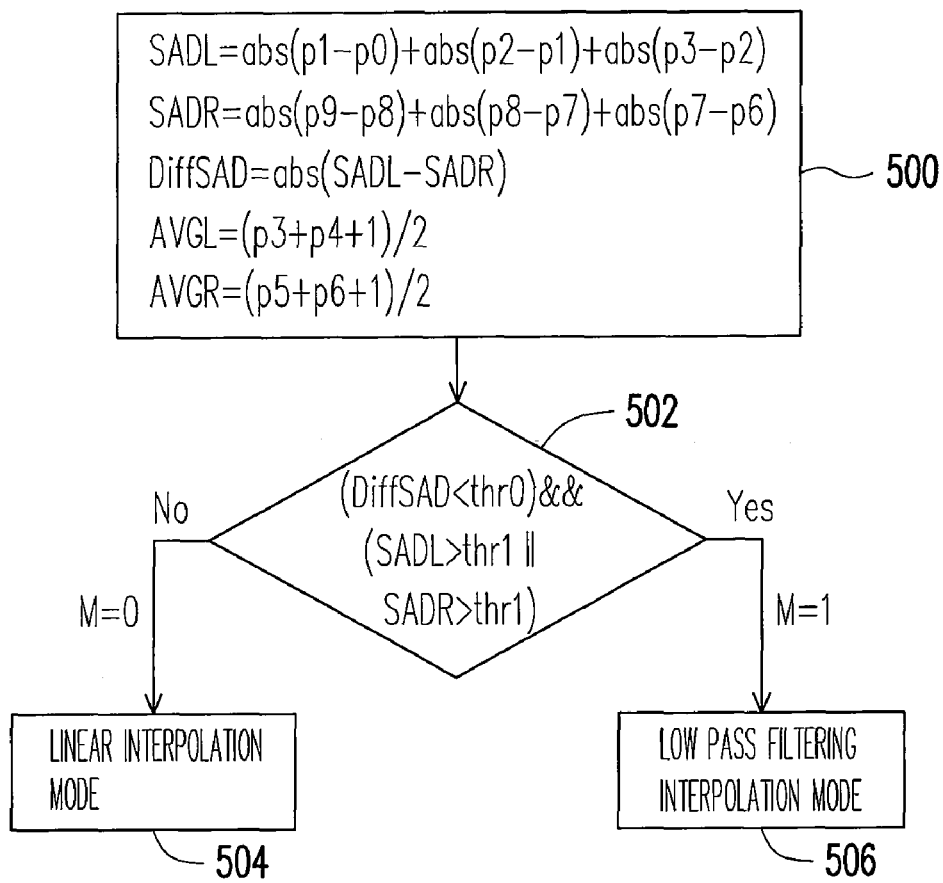
FIG. 6 illustrates a mechanism for determining an interpolation mode according to an embodiment of the present invention.

The interpolation mode determination mechanism adopted by the present invention will be described below. FIG. 6 illustrates a mechanism for determining an interpolation mode according to an embodiment of the present invention. Referring to FIG. 6, in step 500, a left uniformity of the original pixel values at the left side is calculated, and a right uniformity of the original pixel values at the right side is calculated. The left uniformity may be calculated with following expression:

$$SADL=abs(p1-p0)+abs(p2-p1)+abs(p3-p1), \quad (1)$$

wherein abs( ) represents an absolute value, p0~p3 represent the original pixel values (i.e. gray level values) in FIG. 4. Similarly, the right uniformity may be calculated as following:

$$SADR=abs(p9-p8)+abs(p8-p7)+abs(p7-p6). \quad (2)$$

Next, an absolute difference between the left uniformity and the right uniformity is calculated as following:

$$DiffSAD=abs(SADL-SADR). \quad (3)$$

In addition, foregoing calculation is used for determining whether the interpolation point is in the central region or the marginal region of an object. Actually, the interpolation point is calculated according to an interpolation mode. Thus, if necessary, a left average value and a right average value may also be calculated as:

$$AVGL=(p3+p4+1)/2;$$

$$AVGR=(p5+p6+1)/2, \quad (4)$$

wherein the addition of 1 is brought for rounding the decimal.

Next, a determination mechanism is provided for determining whether a linear interpolation or a low pass filtering interpolation is used in step 502. In step 502, "&&" represents "AND" logic calculation, and "||" represents "OR" logic calculation. First, whether the absolute difference is smaller than a threshold th0 is determined. If the absolute difference is smaller than the threshold th0, the interpolation point may fall within the central region of an object. To increase the accuracy of the determination, whether the left uniformity SADL or the right uniformity SADR is greater than a threshold th1 is further determined. When both of the two conditions are met, the interpolation point is determined to be in the central region of the object, for example, and the pixel value M=1 corresponding to the interpolation point is recorded (as the determination result of the target pixel). Otherwise, the pixel values of other interpolation points which do not meet the two conditions are recorded as M=0. The interpolation points having M=1 are calculated through a low pass filtering interpolation, and the interpolation points having M=0 are calculated through a linear interpolation 504. The principle of foregoing determination logic is: if the target pixel (the pixel position to be interpolated) is in the central region of an object, then theoretically, the difference between the pixel uniformities at both sides of the target pixel is not very large; on the other hand, if the target pixel is in the marginal region of an object, then theoretically, the difference between the pixel uniformities at both sides of the target pixel must be dramatic (in the present invention, foregoing determination is performed by using the threshold th0). Besides, in the present embodiment, in order to eliminate the situation that the entire area has the same pixel value, whether at least one uniformity is greater than the threshold th1 is further determined, and if so, the target pixel is then determined to be in the central region of the object.

However, it should be noted here that foregoing determination mechanism is only an embodiment of the present invention, but is not intended for limiting the scope of the present invention. Any method or apparatus which can determine whether the target pixel is in the central region or the marginal region of an object can be adopted by the present invention. For example, even though the interpolation position of the target pixel is determined by using pixel information of a certain scan line in foregoing description, 2-D or 3-D pixel information may also be used for determining the interpolation position of the target pixel in an actual application.

According to the linear interpolation 504, two adjacent original pixel values may be used as reference values. However, this is not the only way. For example, the average values obtained in foregoing expressions (4) may also be used as the reference values of the linear interpolation. The low pass filtering interpolation mechanism 506 is a conventional interpolation method therefore will not be described herein.

Figure 7:
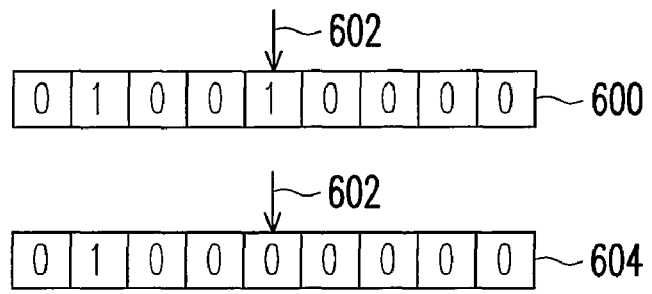
FIG. 7 illustrates a second phase determination logic according to an embodiment of the present invention.

Other calculations can be further performed to ensure the accuracy of the determination. FIG. 7 illustrates a second phase determination logic according to an embodiment of the present invention. According to foregoing analysis, each corresponding interpolation point has a determination result M. Next, an inspection window 600 having an odd number of interpolation points is obtained, wherein the width of the inspection window 600 may be W=9. As to the interpolation point 602, M=1. After that, the number of interpolation points having their determination results M=1 in the inspection window 600 is calculated. Since the value of M is "1" or "0", the determination results M of the interpolation points are directly added to obtain S=2. Thereafter, whether S>(W−1)/2 is determined. If S>(W−1)/2, the interpolation point is determined to be interpolated in a low pass filtering interpolation mode, namely, M=1; otherwise, the interpolation point is determined to be interpolated in a linear interpolation mode, namely, M=0. In the present embodiment, the condition S>(W−1)/2 is not met, the interpolation point 602 is changed to be interpolated in a linear interpolation mode instead of the low pass interpolation mode. Accordingly, the distribution of the determination results M in the new inspection window 604 is changed. The inspection window 600 moves along a line frame of image. According to the actual design, the values in the new inspection window 604 are determined together with the values in the next inspection window 600. However, the values in the inspection window 600 may also be determined by using the original values of the determination results M obtained in the first phase.

Figure 8A:
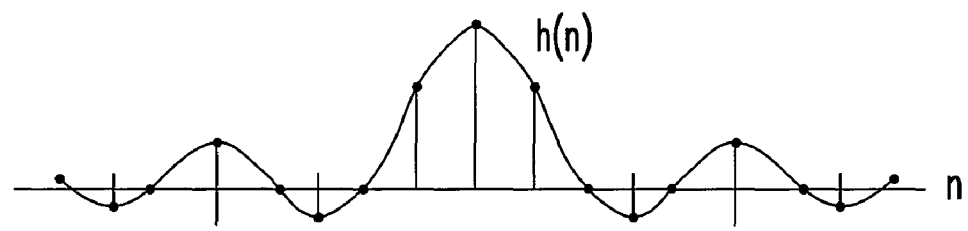
FIG. 8A is a waveform of a half-band low pass filtering node h(n) according to an embodiment of the present invention.
Figure 8B:
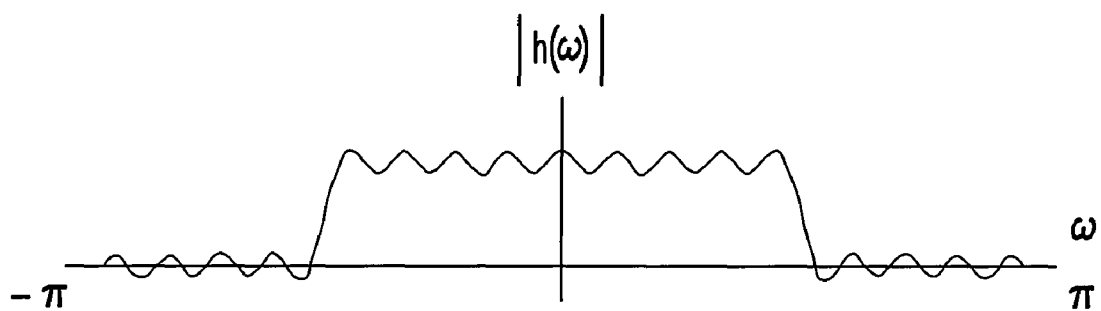
FIG. 8B is a distribution diagram of the half-band low pass filtering node h(n) in FIG. 8A in a frequency domain according to an embodiment of the present invention.
Figure 9:
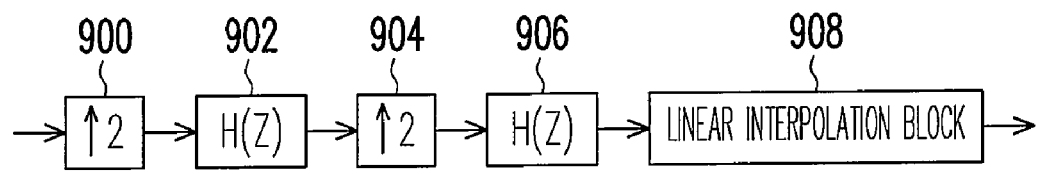
FIG. 9 illustrates a half-band low pass filtering interpolation mechanism according to an embodiment of the present invention.

Generally speaking, the calculation of low pass filtering interpolation is very complex, especially when the scaling rate R is large, which may increase the calculation load and reduce the operation speed. As to a TV, the scaling rate R thereof is substantially smaller than or equal to 4. For example, the resolution of an original TV signal is 640×480, and when the horizontal display line is converted into an image of 1920 pixels, four over-samplings can be performed. Thus, a half-band low pass filtering interpolation mechanism can be adopted. FIG. 8A is a waveform of a half-band low pass filtering node h(n) according to an embodiment of the present invention. FIG. 8B is a distribution diagram of the half-band low pass filtering node h(n) in FIG. 8A in a frequency domain according to an embodiment of the present invention, and FIG. 8B is a distribution diagram in a frequency domain corresponding to FIG. 8A. The n in the filtering node h(n) is ... −3, −2, −1, 0, 1, 2, 3 ... . As to a half-band filtering interpolation, h(0)=1 and h(n)=0, wherein n is an odd number, and accordingly, only those interpolation points of even numbers have actual values. |h(ω)| is cut off at π/2 to form the half-band filtering. In addition, the ripple oscillation of the distribution has a large extent. Next, the pixel values are calculated through a half-band calculation as shown in FIG. 9, wherein the pixel values are calculated by using an up-sampler 900 and a filter 902 twice and then an up-sampler 904 and a filter 906, so as to obtain the reference pixel values. After that, the interpolated pixel data in the central region of an object is obtained through a linear interpolation by using a linear interpolation block 908 according to the reference pixel values. Even though the actual calculation is complex, but it should be understood by those having ordinary knowledge in the art, therefore the actual calculation will not be described herein.

Figure 10:
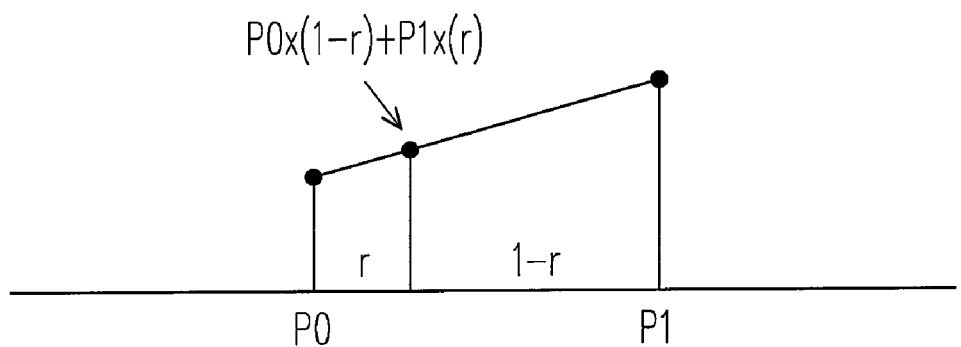
FIG. 10 illustrates a linear interpolation mechanism according to an embodiment of the present invention.

Additionally, those interpolation points in the marginal region of an object are directly calculated through a linear interpolation according to the scaling rate r of the interpolation positions, as shown in FIG. 10, wherein P0 and P1 are the pixel values of two original pixel points.

Figure 11:
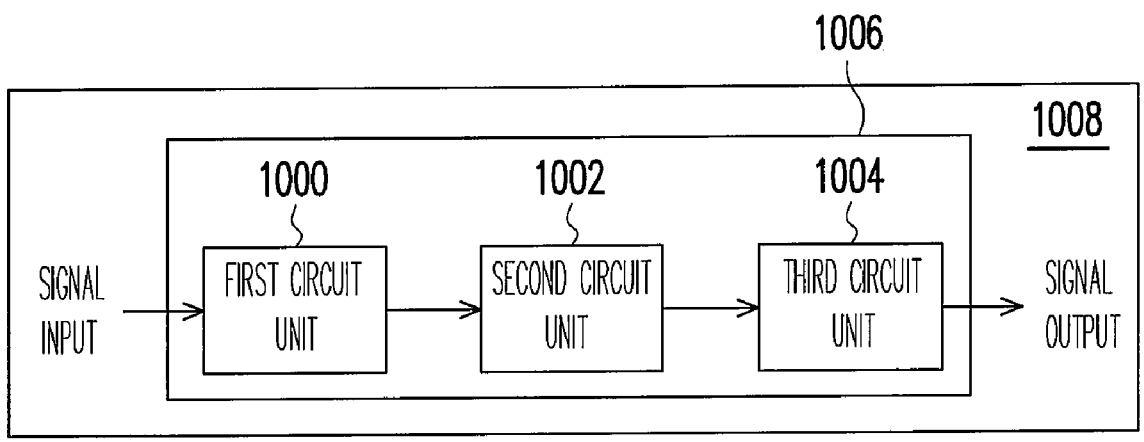
FIG. 11 is a block diagram of an image display apparatus according to an embodiment of the present invention.

In the present invention, foregoing interpolation mechanism can be implemented with a hardware circuit. FIG. 11 is a block diagram of an image display apparatus according to an embodiment of the present invention. Referring to FIG. 11, as described in foregoing embodiment illustrated in FIG. 2, an image scale device 1006 may be disposed in the image display apparatus 1008 for receiving a plurality of original pixel values of an image and outputs the scaled pixel values. The image scale device 1006 may include a first circuit unit 1000 for receiving input signals so as to determine an interpolation position of a target pixel in the image. In other words, the procedure executed in step 100 as illustrated in FIG. 2 can be implemented all by hardware, or the combination of hardware and software. Next, as in step 102, the second circuit unit 1002 determines whether the interpolation position of the target pixel is in the central region or the marginal region of an object and generates a determination result with respect to the target pixel. As in step 104, the third circuit unit 1004 selects a pixel value interpolation mode according to the determination result to perform a pixel value interpolation. After that, the image signal which has been appropriately scaled is output. Corresponding circuit may be added to each circuit unit according to the expected function. The actual circuit design should be understood by those having ordinary knowledge in the art therefore will not be described herein.

In the present invention, two interpolation modes are respectively used for interpolating pixels in the central region and the marginal region of an object. Thus, both the characteristics of the original image in the central region of the object and the original sharpness at the edges of the object can be retained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image data processing method, comprising:
inputting a plurality of original pixel values of an image;
determining an interpolation position of a target pixel in the image;
determining whether the interpolation position of the target pixel is in a central region or a marginal region of an object and generating a determination result with respect to the target pixel; and
selecting a pixel value interpolation mode according to the determination result to perform a pixel value interpolation,
wherein the step of determining whether the interpolation position of the target pixel is in the central region or the marginal region of the object comprises:
obtaining a first number of the original pixel values in a first direction and a second number of the original pixel values in a second direction with the interpolation position as a center and using the obtained original pixel values as a plurality of analysis samples;
calculating a first uniformity of the first number of original pixel values, and calculating a second uniformity of the second number of original pixel values;
calculating an absolute difference between the first uniformity and the second uniformity; and
determining the interpolation position of the target pixel is in the central region of the object when the absolute difference is smaller than a first threshold and at least one of the first uniformity and the second uniformity is greater than a second threshold, and otherwise, determining the interpolation position of the target pixel is in the marginal region of the object.

2. The image data processing method according to claim 1 further comprising a correction step, wherein the correction step comprises:
obtaining an odd number W of the determination result as an inspection window with the interpolation position as a center;
obtaining a number S of interpolation positions determined to be in the central region of the object among a plurality of determination results in the inspection window; and
determining whether S>(W−1)/2, wherein if S>(W−1)/2, the interpolation position of the target pixel is determined to be in the central region of the object, otherwise, the interpolation position of the target pixel is determined to be in the marginal region of the object.

3. The image data processing method according to claim 2, wherein the inspection window moves along a display line to perform corresponding corrections.

4. The image data processing method according to claim 1, wherein the step of selecting the pixel value interpolation mode according to the determination result comprises:
selecting a filtering-based interpolation mechanism for performing a pixel value interpolation if the interpolation position of the target pixel is in the central region of the object.

5. The image data processing method according to claim 4, wherein the filtering-based interpolation mechanism is a low pass filtering interpolation mechanism.

6. The image data processing method according to claim 5, wherein the low pass filtering interpolation mechanism is a half-band low pass filtering interpolation mechanism.

7. The image data processing method according to claim 1, wherein the step of selecting the pixel value interpolation mode according to the determination result comprises:
selecting a linear interpolation mechanism for performing the pixel value interpolation if the interpolation position of the target pixel is in the marginal region of the object.

8. The image data processing method according to claim 7, wherein two reference pixel values of the linear interpolation mechanism is two original pixel values or two original pixel average values at both sides of the interpolation position.

9. An image display apparatus, comprising:
an image scale device, receiving a plurality of original pixel values of an image, and outputting the scaled pixel values, the image scale device comprising:
a first circuit unit, determining an interpolation position of a target pixel in the image;
a second circuit unit, determining whether the interpolation position of the target pixel is in the central region or the marginal region of an object and generating a determination result with respect to the target pixel; and
a third circuit unit, selecting a pixel value interpolation mode according to the determination result to perform a pixel value interpolation,
wherein the second circuit unit obtains a first number of the original pixel values in a first direction and a second number of the original pixel values in a second direction with the interpolation position as a center and using the obtained original pixel values as a plurality of analysis samples; calculates a first uniformity of the first number of original pixel values, and calculating a second uniformity of the second number of original pixel values; calculates an absolute difference between the first uniformity and the second uniformity; and determines the interpolation position of the target pixel is in the central region of the object when the absolute difference is smaller than a first threshold and at least one of the first uniformity and the second uniformity is greater than a second threshold, and otherwise, determining the interpolation position of the target pixel is in the marginal region of the object.

10. The image display apparatus according to claim 9, wherein the second circuit unit further obtains an odd number W of the determination result as an inspection window with the interpolation position as a center of the object; obtains a number S of interpolation positions determined to be in the central region of the object among a plurality of determination results in the inspection window; and determines whether S>(W−1)/2, wherein if S>(W−1)/2, the interpolation position of the target pixel is determined to be in the central region of the object, otherwise, the interpolation position of the target pixel is determined to be in the marginal region of the object.

11. The image display apparatus according to claim 10, wherein the inspection window moves along a display line to perform corresponding corrections.

12. The image display apparatus according to claim 9, wherein the third circuit unit selects a filtering-based interpolation mechanism for performing the pixel value interpolation if the second circuit unit determines that the interpolation position of the target pixel is in the central region of the object.

13. The image display apparatus according to claim 12, wherein the filtering-based interpolation mechanism is a low pass filtering interpolation mechanism.

14. The image display apparatus according to claim 13, wherein the low pass filtering interpolation mechanism is a half-band low pass filtering interpolation mechanism.

15. The image display apparatus according to claim 9, wherein the third circuit unit selects a linear interpolation mechanism for performing the pixel value interpolation if the second circuit unit determines that the interpolation position of the target pixel is in the marginal region of the object.

16. The image display apparatus according to claim 15, wherein two reference pixel values of the linear interpolation mechanism is two original pixel values or two original pixel average values at both sides of the interpolation position.

17. The image data processing method according to claim 1, wherein the object in the image is a displayed content characterized by the marginal region.

18. The image display apparatus according to claim 9, wherein the object in the image is a displayed content characterized by the marginal region.

* * * * *